(12) United States Patent
Myers

(10) Patent No.: US 12,330,034 B1
(45) Date of Patent: Jun. 17, 2025

(54) BREAKAWAY ATTACHMENT FOR HONDO KNOT

(71) Applicant: J. R Myers, Felton, PA (US)

(72) Inventor: J. R Myers, Felton, PA (US)

( * ) Notice: Subject to any disclaimer, the term of this patent is extended or adjusted under 35 U.S.C. 154(b) by 0 days.

(21) Appl. No.: 18/237,255

(22) Filed: Aug. 23, 2023

Related U.S. Application Data

(63) Continuation-in-part of application No. 16/993,873, filed on Aug. 14, 2020, now abandoned.

(51) Int. Cl.
*A63B 69/00* (2006.01)
*A01K 15/00* (2006.01)

(52) U.S. Cl.
CPC ........ *A63B 69/0068* (2013.01); *A01K 15/003* (2013.01)

(58) Field of Classification Search
CPC ........................ A63B 69/0068; A01K 15/003
See application file for complete search history.

(56) References Cited

U.S. PATENT DOCUMENTS

| | | | | |
|---|---|---|---|---|
| 1,702,596 A * | 2/1929 | Crockett | ............... | F16B 45/035 242/615.3 |
| 2,518,179 A * | 8/1950 | Quinby | ................ | A01K 15/003 24/115 F |
| 3,584,606 A * | 6/1971 | Reidhead | ............. | A01K 15/003 403/209 |
| 3,629,908 A * | 12/1971 | Phillips | .................... | F16G 11/14 24/288 |
| 4,928,634 A * | 5/1990 | Voigt | .................... | A01K 15/003 24/129 R |
| 5,806,469 A * | 9/1998 | Cooper-Ratliff | ....... | A01K 15/04 119/865 |
| 6,012,204 A * | 1/2000 | Roethler | ............... | B60P 7/0823 24/598.5 |
| 6,382,138 B1 * | 5/2002 | Campbell | ............ | A01K 15/003 119/865 |
| 9,408,479 B2 * | 8/2016 | Hasbany | .................... | A47F 7/03 |
| 2013/0171595 A1 * | 7/2013 | Glover | ............... | G09B 19/0076 24/129 R |
| 2016/0238177 A1 * | 8/2016 | Clever | ..................... | B67D 7/04 |

* cited by examiner

*Primary Examiner* — David M Upchurch
(74) *Attorney, Agent, or Firm* — Richard K Thomson

(57) ABSTRACT

A one-piece element shaped like a bow-legged bronco buster has an enlarged head that is received in a half hitch of a hondo knot of a lariat used in practice roping. When the target has been encircled by the loop of the lariat, applying force on the rope above the hondo knot causes the ankles of the two bowed legs to flex outwardly releasing the free end of the loop so that the hondo knot and the breakaway attachment secured thereto can be retrieved for the next practice throw.

1 Claim, 2 Drawing Sheets

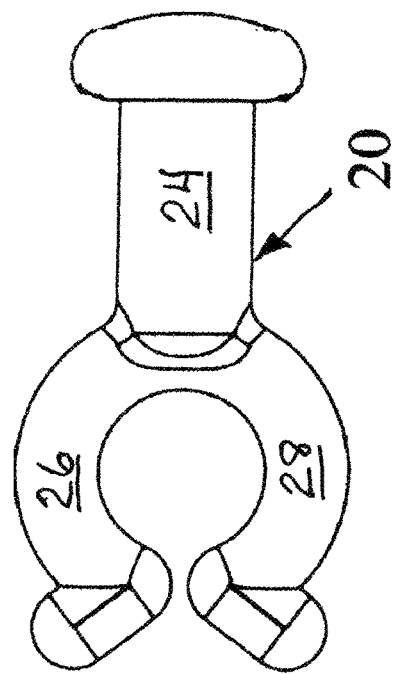
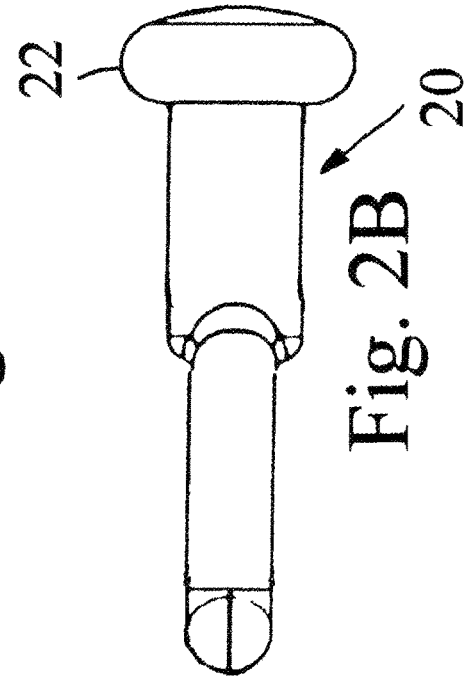
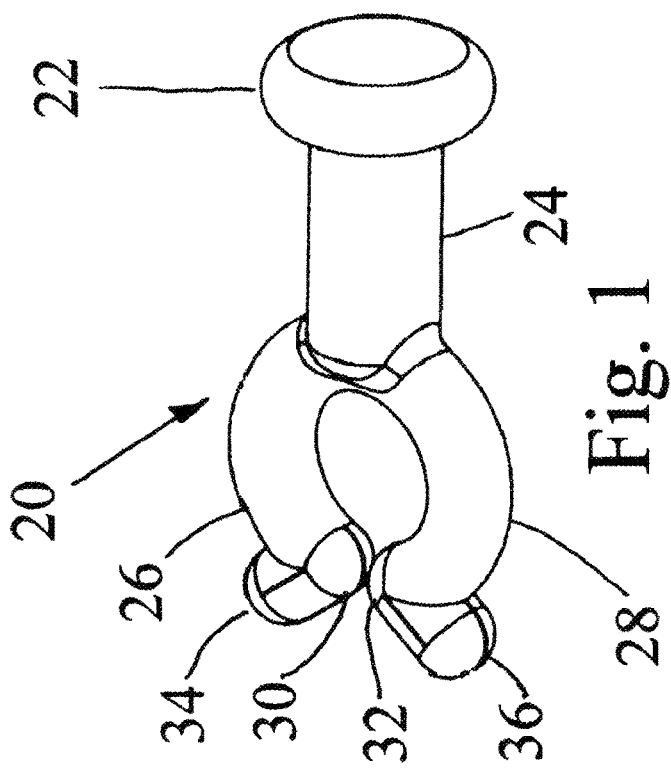
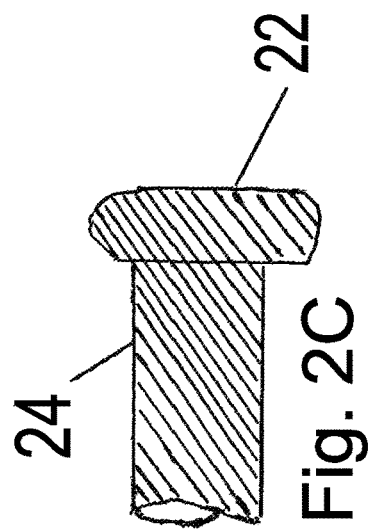

BREAKAWAY ATTACHMENT FOR HONDO KNOT

This application is a continuation-in-part of U.S. patent application Ser. No. 16/993,873 filed Sep. 15, 2020, which is hereby incorporated by reference in its entirety.

BACKGROUND AND SUMMARY OF THE INVENTION

The present invention is directed to the field of roping. More particularly, the present invention is directed to breakaway attachment for a hondo knot to permit easy retrieval during practice roping.

There are a number of items on the market to permit retrieval of lariat following a throw at a dummy or actual calf, steer or other target. The majority of these devices require the hondo knot to be removed or sectioned to allow their insertion into the length of the rope to be tossed. It is among the objects of the present invention to provide a breakaway attachment that can be interconnected to the hondo knot without the need to cut, or otherwise damage, the hondo knot or the rope in which it is formed.

The present invention comprises a breakaway attachment for a hondo knot in a lariat, the attachment including a one-piece element shaped like a bow-legged bronco buster, the one-piece element having i) an enlarged head which is cinched into a half-hitch of the hondo knot without the need to cut the hondo knot; ii) a pair of legs which extend outwardly from a neck that mounts the head, the pair of legs wrapping around a free end of the lariat in a manner similar to the way legs of the bow-legged bronco buster encircle a horse, each of the pair of legs of the one-piece element having an ankle with outwardly extending feet; whereby the pair of legs grasps the free end of the lariat enabling the lariat to be thrown to lasso a target and, once that objective has been achieved, tensioning the length of the lariat between the target and the breakaway attachment will cause the ankles of the one-piece element to flex outwardly releasing the free end of the lariat allowing retrieval of the hondo knot and the breakaway attachment connected thereto for reconfiguring of the lasso by inserting the free end of the lasso between the pair of legs of the one-piece element for another throw.

Various other features, advantages, and characteristics of the present invention will become apparent after a reading of the following detailed description.

BRIEF DESCRIPTION OF THE DRAWINGS

The preferred embodiment(s) of the breakaway attachment of the present invention is/are described in conjunction with the associated drawings in which like features are indicated with like reference numerals and in which FIG. 1 is a perspective view of a first embodiment of the breakaway attachment of the present invention;

FIG. 2A is a top view of the breakaway attachment of the first embodiment;

FIG. 2B is a side view of the breakaway attachment of the first embodiment;

FIG. 2C is a partial cross-sectional side view of the breakaway attachment of the first embodiment; and, FIG. 3 is a schematic side view of the first embodiment of the breakaway attachment engaging a rope.

DETAILED DESCRIPTION OF THE PREFERRED EMBODIMENT(S)

Figure 3:
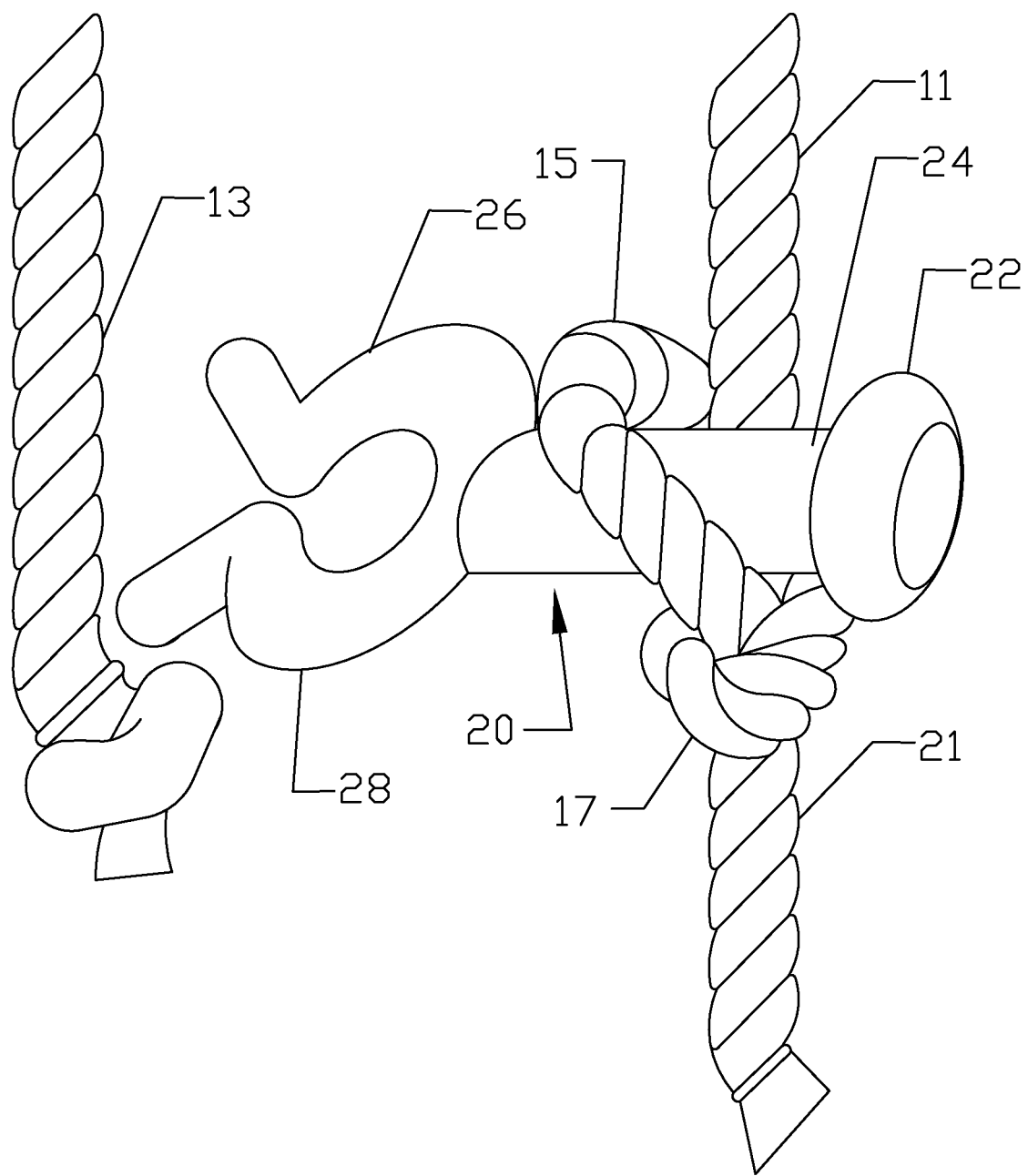

A first embodiment of the breakaway attachment for a hondo knot of the present invention is depicted in FIGS. 1-3 generally at 20. Breakaway attachment 20 is configured as a one-piece element shaped like a bow-legged bronco buster having an enlarged head 22 atop neck 24. As best seen in FIG. 2C, breakaway attachment 20 is formed as a solid one-piece molded element, the head 22 and neck 24 exhibiting this solid, one-piece formation in FIG. 2C. A pair of legs 26, 28 extend outwardly from neck 24 from the end opposite that which mounts head 22. Neck 24 with enlarged head 22 is received in half-hitch 15 of the hondo knot 17 in lariat 11 (FIG. 3). Legs 26, 28 wrap around a free end 13 of the rope/lariat 11 in a manner similar to the way legs of the bow-legged bronco buster encircle a horse. Each of the pair of legs 26, 28 of the one-piece element 20 has an ankle 30, 32 each with an outwardly extending foot 34, 36 respectively. When the loop/noose of the lariat 11 has successfully encircled the target, tensioning the length 21 of the rope between the hand of the thrower and said breakaway attachment 20 will cause said ankles 30, 32 of the one-piece element 20 to flex outwardly releasing the free end 13 of the lariat 11. This allows retrieval of the hondo knot 17 and the breakaway attachment 20 connected thereto for reconfiguring of the lasso by inserting the free end of the lasso between said pair of legs of said one-piece element for another throw.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A breakaway attachment for a hondo knot in a lariat comprising:
   a solid one-piece molded element, said solid one-piece element having
   i) an enlarged head sitting atop a cylindrical neck portion, said enlarged head being cinched into a half-hitch of the hondo knot without the need to cut the hondo knot for release and retrieval;
   ii) a pair of arcuate legs which extend outwardly from said cylindrica neck portion that mounts said head, said pair of arcuate legs wrapping around a free end of the lariat in the way legs of a bronco buster encircle a horse, each of said pair of legs of said solid one-piece molded element having an ankle with an outwardly extending foot, said ankles being arranged in a non-touching relationship to one another;
   whereby said enlarged head, said cylindrical neck portion, and said pair of arcuate legs are aligned in a co-linear manner and further whereby said pair of arcuate legs grasp a free end of the lariat enabling the lariat to be thrown to lasso a target and, once that objective has been achieved, tensioning the length of the lariat between a hand of the thrower and said breakaway attachment will cause said ankles of said one-piece element to flex outwardly releasing the free end of the lariat, allowing retrieval of the hondo knot and said breakaway attachment connected thereto, for reconfiguring of the lasso by inserting the free end of the lasso between said ankles of said pair of arcuate legs of said solid one-piece molded element for another throw.

* * * * *